United States Patent
Dutta et al.

(10) Patent No.: US 11,638,162 B2
(45) Date of Patent: Apr. 25, 2023

(54) REDUCED OVERHEAD SIDELINK BEAM TRAINING

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Franklin Park, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/148,092

(22) Filed: Jan. 13, 2021

(65) Prior Publication Data
US 2022/0225117 A1 Jul. 14, 2022

(51) Int. Cl.
| | |
|---|---|
| *H04W 16/28* | (2009.01) |
| *H04B 7/06* | (2006.01) |
| *H04W 72/02* | (2009.01) |
| *H04W 76/27* | (2018.01) |
| *H04W 72/04* | (2023.01) |
| *H04W 80/02* | (2009.01) |
| *H04W 72/044* | (2023.01) |
| *H04W 92/18* | (2009.01) |

(52) U.S. Cl.
CPC .......... *H04W 16/28* (2013.01); *H04B 7/0617* (2013.01); *H04W 72/02* (2013.01); *H04W 72/046* (2013.01); *H04W 72/0406* (2013.01); *H04W 76/27* (2018.02); *H04W 80/02* (2013.01); *H04W 92/18* (2013.01)

(58) Field of Classification Search
CPC ..... H04W 16/28; H04W 76/27; H04W 72/02; H04W 72/0406; H04W 72/046; H04W 80/02; H04W 92/18; H04B 7/0617
See application file for complete search history.

(56) References Cited

U.S. PATENT DOCUMENTS

| | | | |
|---|---|---|---|
| 2017/0367120 A1* | 12/2017 | Murray | H04W 74/0833 |
| 2020/0187145 A1* | 6/2020 | Chae | H04W 4/70 |
| 2020/0195317 A1* | 6/2020 | Yasukawa | H04W 72/0406 |
| 2020/0245281 A1* | 7/2020 | Chae | H04W 72/048 |
| 2021/0212051 A1* | 7/2021 | Raghavan | H04W 8/005 |
| 2021/0258764 A1* | 8/2021 | Zhang | H04L 5/0094 |
| 2022/0078753 A1* | 3/2022 | Park | H04L 5/0055 |
| 2022/0191673 A1* | 6/2022 | Dutta | H04W 72/0453 |

* cited by examiner

*Primary Examiner* — Mewale A Ambaye
(74) *Attorney, Agent, or Firm* — Harrity & Harrity LLP/Qualcomm Incorporated

(57) ABSTRACT

Various aspects of the present disclosure generally relate to wireless communication. In some aspects, a first user equipment (UE) may communicate, with a second UE, an indication relating to physical sidelink shared channel (PSSCH) beam training. The UE may transmit, to the second UE on symbols included in a transmission time interval, PSSCH data and beam training reference signals to be used by the second UE to perform beam measurements. Numerous other aspects are described.

30 Claims, 10 Drawing Sheets

REDUCED OVERHEAD SIDELINK BEAM TRAINING

FIELD OF THE DISCLOSURE

Aspects of the present disclosure generally relate to wireless communication and to techniques and apparatuses for reduced overhead sidelink beam training.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first UE includes communicating, with a second UE, an indication relating to physical sidelink shared channel (PSSCH) beam training; and transmitting, to the second UE on symbols included in a transmission time interval, PSSCH data and beam training reference signals to be used by the second UE to perform beam measurements.

In some aspects, a method of wireless communication performed by a first UE includes receiving, from a second UE on symbols included in a transmission time interval, PSSCH data and beam training reference signals; decoding the PSSCH data received in the transmission time interval; and performing beam training based at least in part on the beam training reference signals received in the transmission time interval.

In some aspects, a first UE for wireless communication includes a memory and one or more processors operatively coupled to the memory, the memory and the one or more processors configured to: communicate, with a second UE, an indication relating to PSSCH beam training; and transmit, to the second UE on symbols included in a transmission time interval, PSSCH data and beam training reference signals to be used by the second UE to perform beam measurements.

In some aspects, a first UE for wireless communication includes a memory and one or more processors operatively coupled to the memory, the memory and the one or more processors configured to: receive, from a second UE on symbols included in a transmission time interval, PSSCH data and beam training reference signals; decode the PSSCH data received in the transmission time interval; and perform beam training based at least in part on the beam training reference signals received in the transmission time interval.

In some aspects, a non-transitory computer-readable medium storing a set of instructions for wireless communication includes one or more instructions that, when executed by one or more processors of a first UE, cause the UE to: communicate, with a second UE, an indication relating to PSSCH beam training; and transmit, to the second UE on symbols included in a transmission time interval, PSSCH data and beam training reference signals to be used by the second UE to perform beam measurements.

In some aspects, a non-transitory computer-readable medium storing a set of instructions for wireless communication includes one or more instructions that, when executed by one or more processors of an UE, cause the UE to: receive, from a second UE on symbols included in a transmission time interval, PSSCH data and beam training reference signals; decode the PSSCH data received in the transmission time interval; and perform beam training based at least in part on the beam training reference signals received in the transmission time interval.

In some aspects, an apparatus for wireless communication includes means for communicating, with a UE, an indication relating to PSSCH beam training; and means for transmitting, to the second UE on symbols included in a transmission time interval, PSSCH data and beam training reference signals to be used by the second UE to perform beam measurements.

In some aspects, an apparatus for wireless communication includes means for receiving, from a second UE on symbols included in a transmission time interval, PSSCH data and beam training reference signals; means for decoding the PSSCH data received in the transmission time interval; and means for performing beam training based at least in part on the beam training reference signals received in the transmission time interval.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
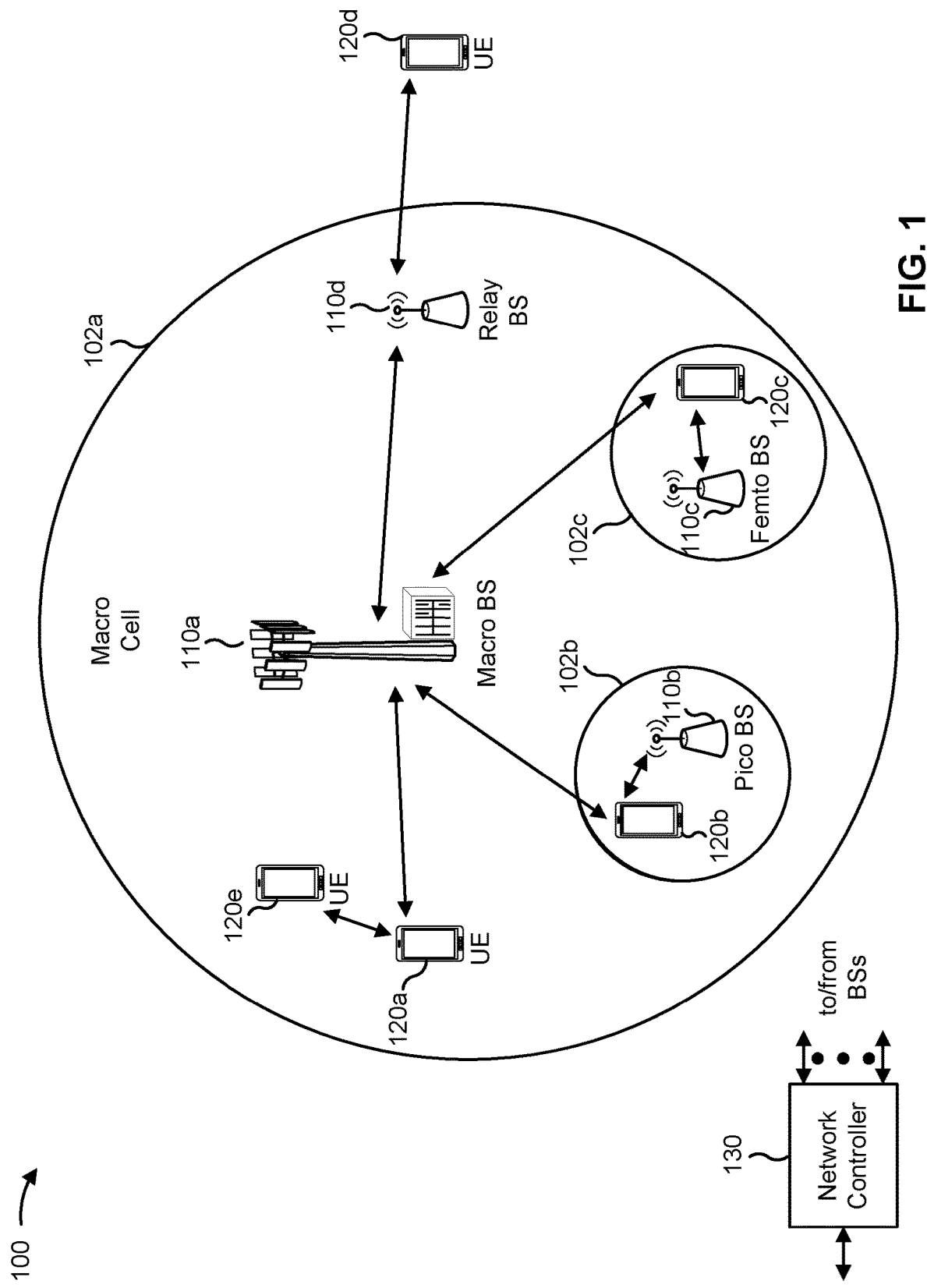
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
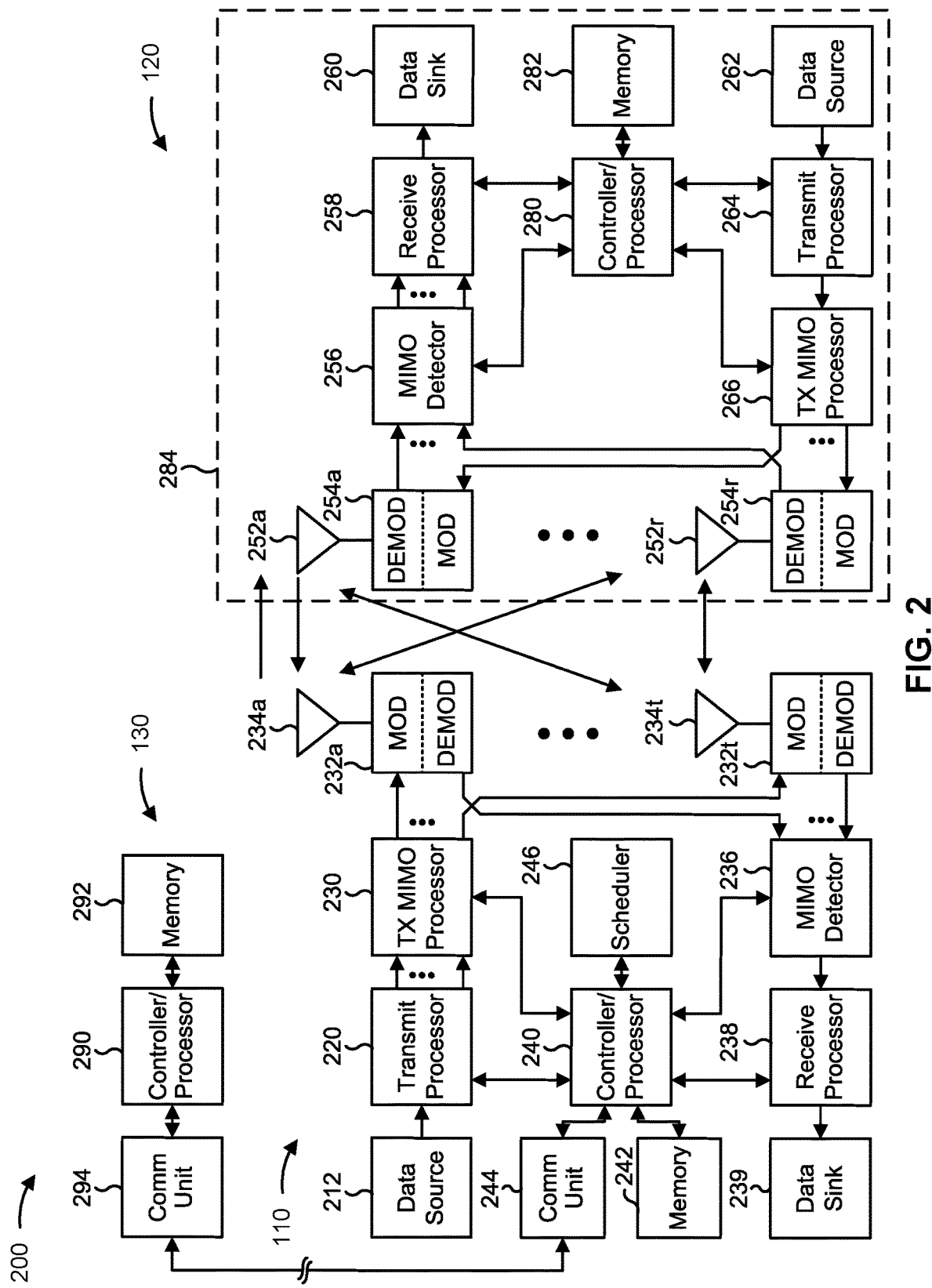
FIG. 2 is a diagram illustrating an example of abase station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-9.

Controller/processor 240 of base station 110, controller/processor 280 of UE 120, and/or any other component(s) of FIG. 2 may perform one or more techniques associated with reduced overhead sidelink beam training, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for communicating, with a second UE, an indication relating to physical sidelink shared channel (PSSCH) beam training: and/or means for transmitting, to the second UE on symbols included in a transmission time interval, PSSCH data and beam training reference signals to be used by the second UE to perform beam measurements. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving, from the second UE, a radio resource control (RRC) communication including the indication.

In some aspects, the UE 120 includes means for transmitting, to the second UE, an RRC communication including the indication.

In some aspects, the UE 120 includes means for transmitting, in a control channel of the transmission time interval, sidelink control information (SCI) indicating that the transmission time interval is for PSSCH beam training.

In some aspects, the UE 120 includes means for transmitting, in a control channel of another transmission time interval, sidelink control information indicating a reservation of the transmission time interval for PSSCH beam training.

In some aspects, the UE 120 includes means for transmitting in each of the multiple sets of symbols in the transmission time interval, the beam training reference signals and a repetition of a medium access control (MAC) control element.

In some aspects, the UE 120 includes means for transmitting, over the multiple sets of symbols in the transmission time interval, a code block including the PSSCH data, wherein the code block is generated using a first code rate that is determined such that puncturing of the respective automatic gain control symbols of the multiple sets of symbols at the second UE results in a second code rate at the second UE that is higher than the first code rate.

In some aspects, the UE 120 includes means for transmitting, over the multiple sets of symbols in the transmission time interval, multiple code blocks including the PSSCH data, wherein each of multiple code blocks is generated using the first code rate, and wherein the multiple code blocks are concatenated, based in part on locations of the automatic gain control signals in the multiple sets of symbols, to cause a number of bits punctured at the second UE to be the same for each of the multiple code blocks.

In some aspects, the UE 120 includes means for receiving, from a second UE on symbols included in a transmission time interval, PSSCH data and beam training reference signals; means for decoding the PSSCH data received in the transmission time interval; and/or means for performing beam training based at least in part on the beam training reference signals received in the transmission time interval.

The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for performing beam measurements for multiple receive beams of the first UE based at least in part on the beam training reference signals; and/or means for selecting a receive beam from the multiple receive beams of the first UE based at least in part on the beam measurements.

In some aspects, the UE 120 includes means for transmitting, to the second UE, an RRC communication including an indication requesting PSSCH beam training.

In some aspects, the UE 120 includes means for receiving, from the second UE, an RRC communication including an indication relating to PSSCH beam training.

In some aspects, the UE 120 includes means for receiving, in a control channel of the transmission time interval, SCI indicating that the transmission time interval is for PSSCH beam training.

In some aspects, the UE 120 includes means for receiving, in a control channel of another transmission time interval, sidelink control information indicating a reservation of the transmission time interval for PSSCH beam training.

In some aspects, the UE 120 includes means for performing, for each of multiple receive beams of the first UE, beam measurements based at least in part on the beam training reference signals received in the one or more symbols of a respective one of the multiple sets of symbols in the transmission time interval.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
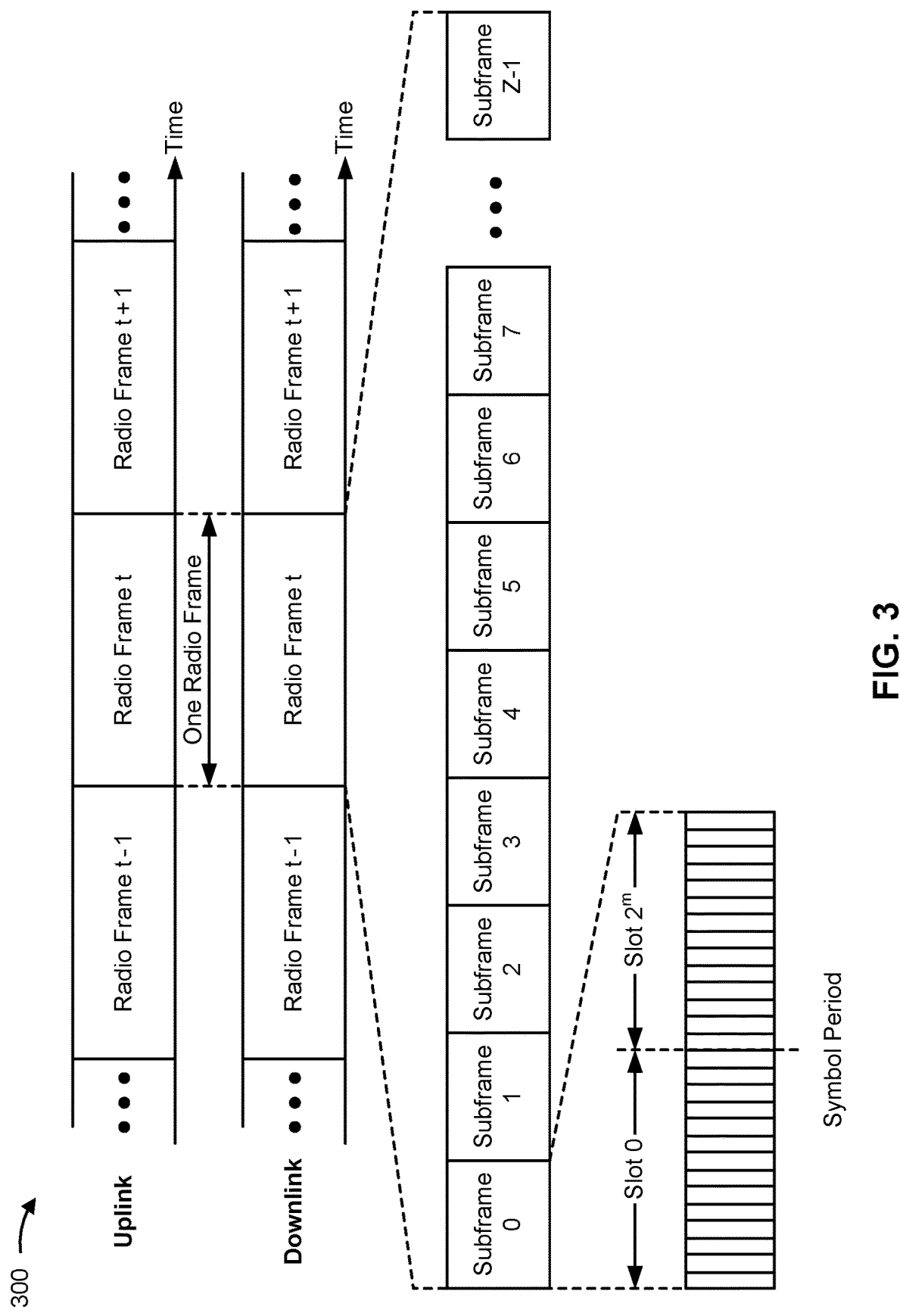
FIG. 3 is a diagram illustrating an example of a frame structure in a wireless communication network, in accordance with various aspects of the present disclosure.

FIG. 3 is a diagram illustrating an example 300 of a frame structure in a wireless communication network, in accordance with various aspects of the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4:
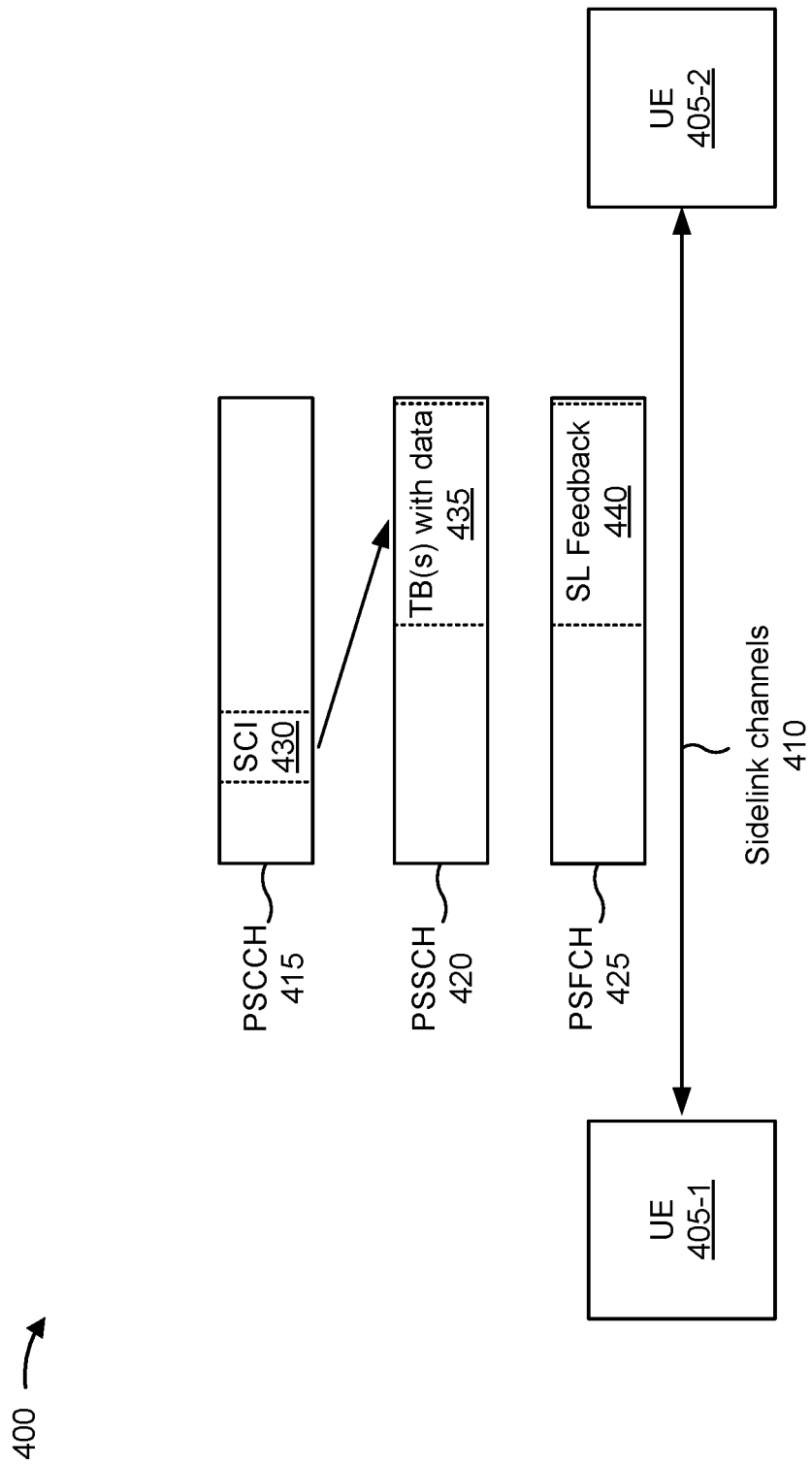
FIG. 4 is a diagram illustrating an example of sidelink communications, in accordance with various aspects of the present disclosure.

FIG. 4 is a diagram illustrating an example 400 of sidelink communications, in accordance with various aspects of the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, V2P (vehicle-to-pedestrian) communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a PSSCH 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry SCI 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, a modulation and coding scheme (MCS) to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
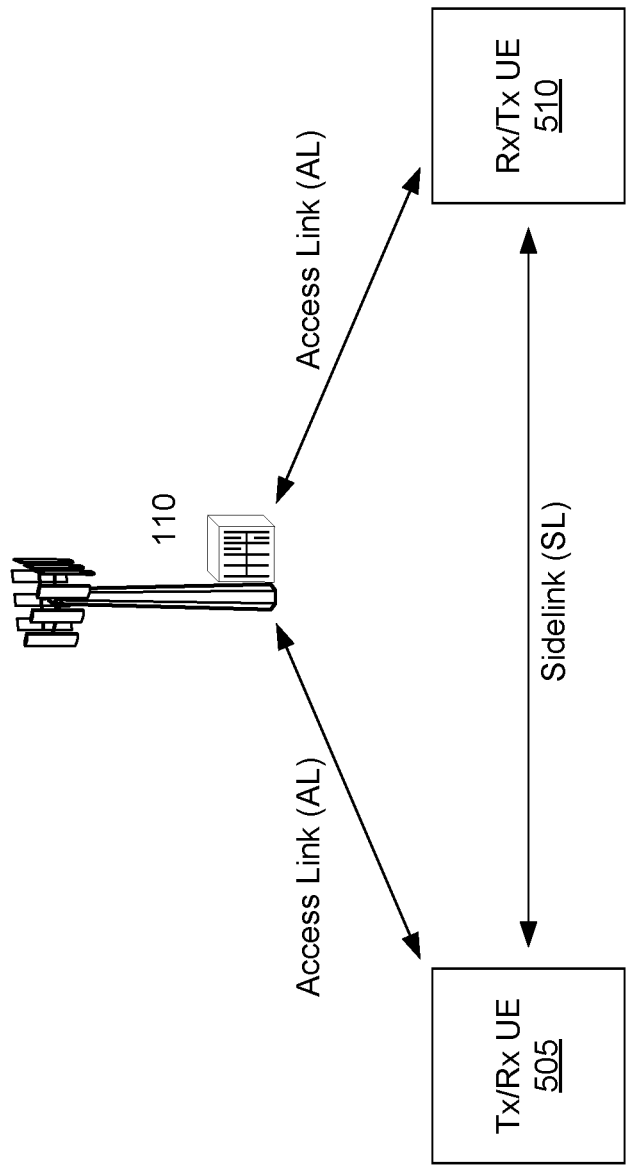
FIG. 5 is a diagram illustrating an example of sidelink communications and access link communications, in accordance with various aspects of the present disclosure.

FIG. 5 is a diagram illustrating an example 500 of sidelink communications and access link communications, in accordance with various aspects of the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Network devices (e.g., UEs and/or base stations) typically utilize beamformed access for communicating in the FR2 frequency range. For sidelink communications (e.g., V2X, D2D, and/or P2P, among other examples) in FR2, a UE may perform beam training to establish a directional beam pair link with a peer (e.g., another UE) for point-to-point unicast communications between the UEs. In some cases, the UEs may be part of a distributed network, and central entities (e.g., base stations and/or roadside units (RSUs), among other examples) may not be present to assign or reserve resources for the UEs to use to perform beam training. Such a network may include a large number of UEs, and each UE may perform beam training to establish a beam pair link with one or more other UEs. Accordingly, establishing and maintaining beamformed links for sidelink communications in FR2 may utilize significant network overheard.

Figure 6:
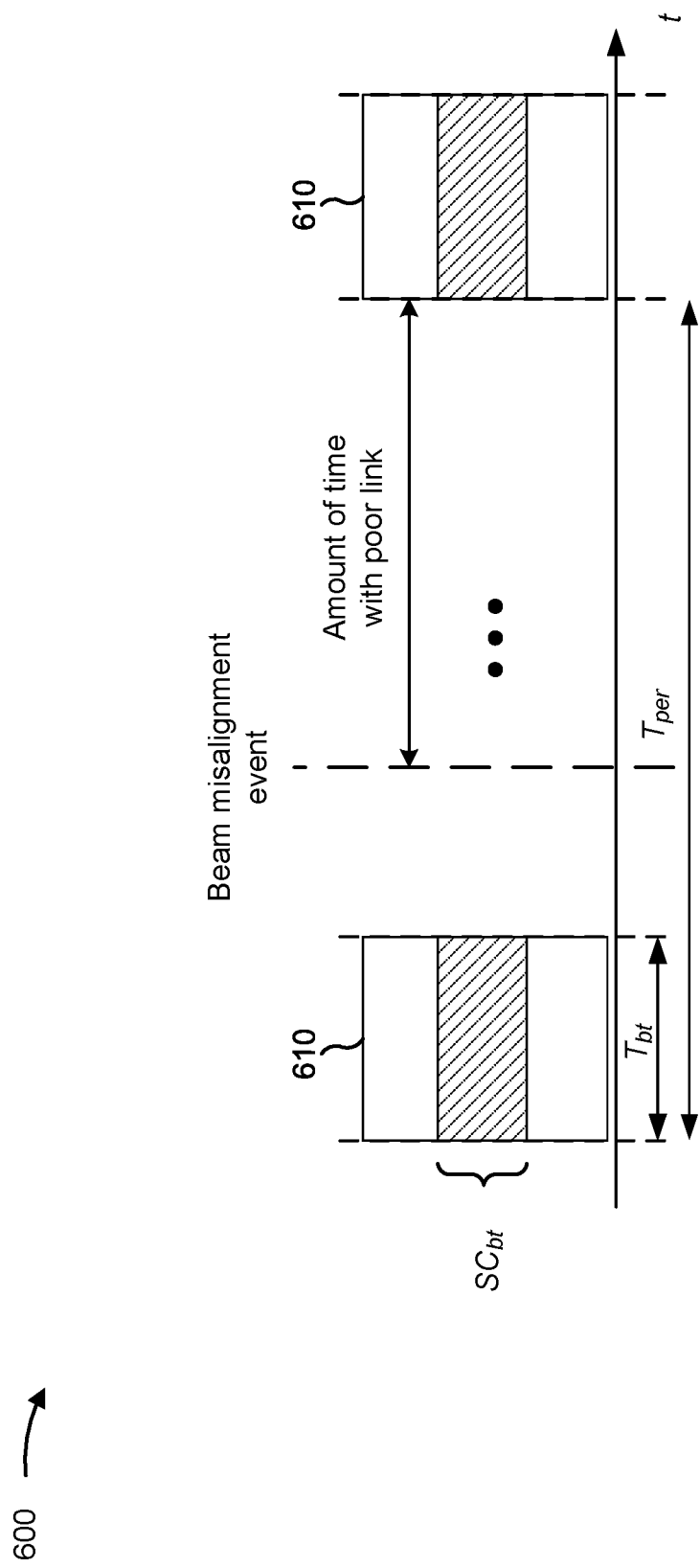
FIG. 6 is a diagram illustrating an example of semi-static resources for sidelink beam training, in accordance with various aspects of the present disclosure.

FIG. 6 is a diagram illustrating an example 600 of semi-static resources for sidelink beam training, in accordance with various aspects of the present disclosure.

As shown in FIG. 6, for distributed sidelink communication in FR2, network-wide periodic resources 610 may be semi-statically configured for beam searching and training. The semi-static beam training resources 610 may be configured in a beam training window $T_{bt}$ (also referred to as a "discovery window"), with instances of the beam training window $T_{bt}$ periodically occurring with a period $T_{per}$. The beam training resources 610 may include time and frequency resources for UEs to transmit beam training reference signals (BT-RSs) to other UEs for beam training. For example, a beam training sub-carrier $SC_{bt}$ or multiple beam training sub-carriers may be configured for the UEs to use to transmit BT-RSs during the beam training window $T_{bt}$.

In some cases, the beam training window $T_{bt}$ may be configured with a relatively long duration, as multiple UEs may need to create and/or maintain beamformed links with each other. Hence, in order to reduce network overhead for beam training, the beam training window $T_{bt}$ may be configured to occur with a longer period $T_{per}$ between instances. For example, a 100 ms beam training window may be configured to occur every 1000 ms, resulting in a 10 percent overhead for beam training. However, millimeter wave (FR2) links may change in time scales of tens or hundreds of milliseconds. For example, a beam misalignment event, such as a blockage by a body, vehicle, or some other obstacle, may cause a beam pair link selected for unicast sidelink communications between UEs to become poor or suboptimal. In that case, the UEs may attempt to communicate over the poor or sub-optimal beam pair link for a prolonged time period. For example, if $T_{bt}$=100 ms and $T_{per}$=1000 ms, and the beam misalignment event occurs 100 ms after an instance of the beam training window, the UEs may attempt to communicate over a poor UE pair link for 800 ms, until the next instance of the beam training window.

Misalignment of the beam pair link between UEs may degrade FR2 sidelink communications between the UEs, resulting in decreased reliability, quality, and speed of the sidelink communications and/or interruption of the sidelink communications between the UEs for a prolonged time period. Reducing the period at which the semi-statically configured beam training window occurs may reduce the amount of time UEs communicate over a degraded beam pair link. However, reducing the period for the beam training window increases the network overhead dedicated to semi-static resources for beam training, resulting in decreased speed and throughput and increased latency for sidelink communications.

Some techniques and apparatuses described herein enable on-demand sidelink beam training in which UEs perform beam training together with PSSCH data transmission. In some aspects, a first UE may transmit, to a second UE, or the second UE may transmit, to the first UE, an indication relating to PSSCH beam training. The first UE may transmit, to the second UE on symbols included in a transmission time interval (TTI), PSSCH data and BT-RSs. The second UE may decode the PSSCH data transmitted from the first UE in the TTI, and the second UE may perform beam training based at least in part on the BT-RSs transmitted from the first UE in the TTI. As a result, beam training may be performed to improve a degraded beam pair link between the first UE and the second UE outside of semi-statically configured beam training windows (e.g., between periodically occurring beam training windows) to reduce the amount of time with the degraded beam pair link. Thus, the reliability, quality, and speed of the sidelink communications may be increased, and interruptions to the sidelink communications may be decreased. Furthermore, the amount of time that the first UE and the second UE communicate using a degraded beam pair link may be reduced without shortening a period at which the semi-statically configured beam training window occurs, thus reducing the network overhead for beam training as compared with shortening the period for the beam training window. This results in increased speed and throughput and decreased latency for sidelink communications in the network.

As indicated above, FIG. 6 is provided as an example. Other examples may differ from what is described with respect to FIG. 6.

Figure 7:
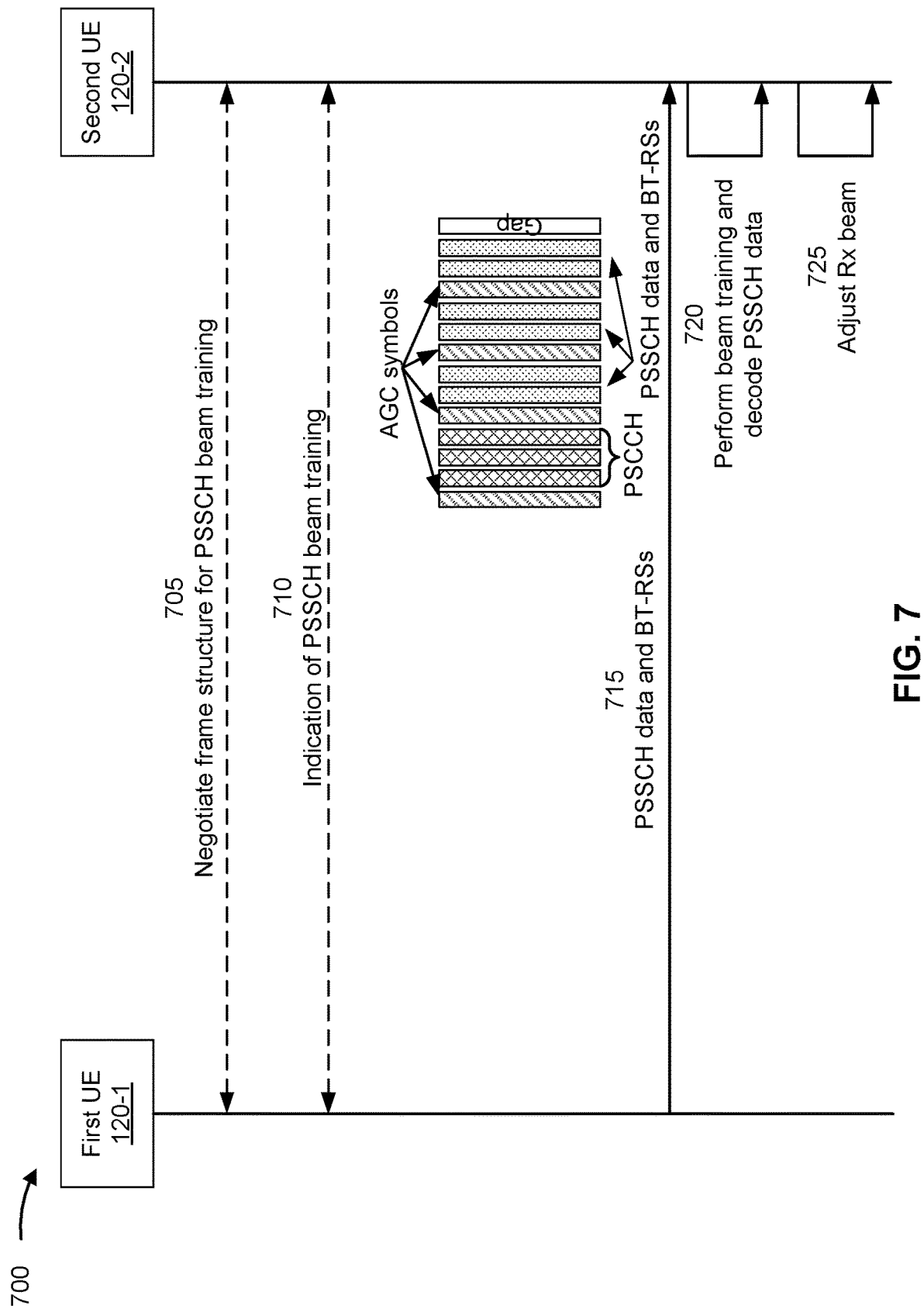
FIG. 7 is a diagram illustrating an example associated with reduced overhead sidelink beam training, in accordance with various aspects of the present disclosure.

FIG. 7 is a diagram illustrating an example 700 associated with reduced overhead sidelink beam training, in accordance with various aspects of the present disclosure. As shown in FIG. 7, example 700 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via a sidelink. As shown in FIG. 7, the first UE 120-1 may be a Tx UE and the second UE 120-2 may be an Rx UE. In some aspects, the first UE 120-1 may be an Rx UE and the second UE 120-2 may be a Tx UE.

As shown in FIG. 7, and by reference number 705, the first UE 120-1 and the second UE 120-2 may negotiate a frame structure for PSSCH beam training. In some aspects, the first UE 120-1 and the second UE 120-2 may communicate via one or more RRC communications to negotiate parameters relating to PSSCH beam training. For example, the first UE 120-1 may transmit an RRC communication that indicates values for one or more parameters to the second UE 120-2, and/or the second UE 120-2 may transmit an RRC communication that indicates values for one or more parameters to the first UE 120-1.

In some aspects, the parameters may include a number of Rx beams to be swept per TTI and a number of symbols to be used for each Rx beam to be swept. The TTI may be any time interval, such frame, subframe, slot, sub-slot, multiple frames, multiple subframes, multiple slots, or multiple sub-slots, among other examples. In some aspects, the first UE 120-1 and the second UE 120-2 may be configured with a default TTI for PSSCH beam training. For example, the default TTI may be specified in a wireless communication standard. In some aspects, the negotiated parameters may include a size of TTI. For example, one of the UEs 120-1 or 120-2 may transmit an RRC communication indicating the size of the TTI to the other one of the UEs 120-1 or 120-2. In some aspects, the first UE 120-1 and/or the second UE 120-2 may determine the size of the TTI based at least in part on the number of Rx beams to be swept and the number of symbols to be used for each RX beam to be swept. In some aspects, the first UE 120-1 and/or the second UE 120-2 may determine the number of symbols to be used for each RX beam to be swept based at least in part on the TTI for PSSCH beam training and the number of RX beams to be swept.

At least one of the first UE 120-1 or the second UE 120-2 may determine the frame structure for the PSSCH beam training based at least in part on the negotiated parameters. For example, the second UE 120-2 may transmit, to the first UE 120-1, an indication of the number of Rx beams to be swept when the second UE 120-2 is the Rx UE, and the first UE 120-1 may determine the frame structure for PSSCH beam training based at least in part on the number of Rx beams to be swept. In this case, the first UE 120-1 may then transmit, to the second UE 120-2, an indication of the frame structure for PSSCH beam training. As used herein, "frame structure" refers to a configuration of symbols and/or other resources in the TTI.

In some aspects, the UEs may utilize a frame structure for PSSCH beam training in which a first symbol of the TTI is an automatic gain control (AGC) symbol and the next p symbols are PSCCH symbols. For example, the next three symbols following the AGC symbol may be PSCCH symbols. The number of PSCCH symbols (p) may correspond to a number of control channel symbols specified in a wireless communication standard. The remaining symbols in the TTI may be grouped into multiple sets of r symbols, with the number of sets of r symbols corresponding to the number of Rx beams to be swept. In some aspects, a final symbol of the TTI may be not be grouped into the sets of r symbols, and may instead be left as a gap between the TTI and a next TTI. For each set of r symbols in the remaining portion of the TTI, a first symbol of the r symbols may be a respective AGC symbol, and the rest of the r−1 symbols may be used for transmitting PSSCH data together with BT-RSs.

In some aspects, the first UE 120-1 and/or the second UE 120-2 may determine the frame structure for PSSCH beam training by selecting a frame structure from a set of configured frame structures for PSSCH beam training. The set of configured frame structures may include multiple different frame structures for PSSCH beam training, and each frame structure may be associated with a respective identifier, such as an index value. In this case, either UE 120-1 or 120-2 may select a frame structure for PSSCH beam training from the set of configured frame structures by transmitting (e.g., via RRC, MAC control element (MAC-CE), or SCI) an indication of the identifier associated with the selected frame structure to the other UE 120-1 or 120-2. In some aspects, the set of configured beam structures may include multiple default frame structures corresponding to different parameters (e.g., number of Rx beams to be swept, number of symbols per Rx beam to be swept, and/or TTI size). In some aspects, the set of configured frame structures may include multiple frame structures determined based on the RRC-based negotiation between the first UE 120-1 and the second UE 120-2.

In some aspects, the first UE 120-1 and the second UE 120-2 may negotiate the frame structure for PSSCH beam training prior to any indication that PSSCH beam training is to be performed. For example, the first UE 120-1 and the second UE 120-2 may negotiate the frame structure for PSSCH beam training based at least in part on establishing an initial beam link pair between the first UE 120-1 and the second UE 120-2 (e.g., in a semi-statically configured beam training window). In some aspects, the first UE 120-1 and the second UE 120-2 may negotiate the frame structure for PSSCH beam training based on one of the UEs 120-1 or 120-2 transmitting an indication that beam training is to be performed to the other UE 120-1 or 120-2. In some aspects, the first UE 120-1 and the second UE 120-2 may be configured to utilize a default frame structure for PSSCH beam training. In this case, the first UE 120-1 and the second UE 120-2 may not negotiate the frame structure for PSSCH beam training.

As further shown in FIG. 7, and by reference number 710, the first UE 120-1 may transmit an indication of PSSCH beam training to the second UE 120-2, or the second UE 120-2 may transmit the indication of PSSCH beam training to the first UE 120-1.

In some aspects, the first UE 120-1 may transmit, to the second UE 120-2, a communication (e.g., RRC communication) including an indication that PSSCH beam training is to be performed. In this case, the first UE 120-1 may transmit the indication to the second UE 120-2 based at least in part on a determination that a current beam pair link for sidelink communications between the first UE 120-1 and the second UE 120-2 has degraded. For example, the first UE 120-1 may determine that the current beam pair link has degraded based at least in part on determining that a measurement (e.g., received signal strength (RSS) measurement) associated with the current beam pair link does not satisfy a threshold.

In some aspects, the second UE 120-2 may transmit, to the first UE 120-1, a communication (e.g., RRC communication) including an indication requesting PSSCH beam training to be performed. In this case, the second UE 120-2 may transmit the indication to the first UE 120-1 based at least in part on a determination that a current beam pair link for sidelink communications between the first UE 120-1 and the second UE 120-2 has degraded. For example, the second UE 120-2 may determine that the current beam pair link has degraded based at least in part on determining that a measurement (e.g., RSS measurement) associated with the current beam pair link does not satisfy a threshold.

In some aspects, the first UE 120-1 may transmit, to the second UE 120-2 in a PSCCH communication, SCI that includes the indication that PSSCH beam training is to be performed. For example, the first UE 120-1 may transmit the SCI in a PSCCH symbol of a TTI, and the SCI may include a bit that indicates that the TTI is for PSSCH beam training. The SCI may also indicate the frame structure to be used for the PSSCH beam training. For example, the SCI may indicate an index value associated with a frame structure of the set of multiple configured frame structures. In some aspects, the first UE 120-1 may transmit a PSCCH communication in a TTI that includes SCI that indicates a future reservation of another TTI for PSSCH beam training.

As further shown in FIG. 7, and by reference number 715, the first UE 120-1 may transmit to the second UE 120-2 in a TTI, PSSCH data and BT-RSs to be used by the second UE 120-2 to perform beam measurements. In some aspects, the first UE 120-1 may transmit the PSSCH data and BT-RSs based at least in part on receiving the indication requesting PSSCH beam training from the second UE 120-2. In some aspects, the first UE 120-1 may transmit the PSSCH data and BT-RSs based at least in part on transmitting the indication that PSSCH data is to be performed to the second UE 120-2. In some aspects, the first UE 120-1 may transmit the PSSCH data and BT-RSs to the second UE 120-2 based at least in part on a determination that the current beam pair link between the first UE 120-1 and the second UE 120-2 has degraded. In this case, the first UE 120-1 may transmit, in a PSCCH communication in the TTI, SCI indicating that the TTI is for PSSCH beam training.

In some aspects, the first UE 120-1 may transmit the PSSCH data and the BT-RSs in the TTI using the negotiated frame structure selected for PSSCH beam training. In some aspects, the first UE 120-1 may select a frame structure for PSSCH beam training (e.g., from the set of configured frame structures), and transmit the PSSCH data and the BT-RSs in the selected frame structure. In this case, the first UE 120-1 may transmit, to the second UE 120-2 in a PSCCH communication in the TTI, SCI indicating the frame structure.

In some aspects, the first UE 120-1 may utilize, for the TTI, a frame structure including an initial AGC symbol, followed by p PSCCH symbols, and multiple sets of r symbols, with the number of sets of r symbols corresponding to the number of Rx beams of the second UE 120-2 to be swept. For each set of r symbols in the TTI, a first symbol of the r symbols may be a respective AGC symbol, and the rest of the r−1 symbols may be used for transmitting PSSCH data together with BT-RSs. For example, as shown in FIG. 7, the TTI includes the initial AGC symbol, followed by three PSCCH symbols, and three sets of r symbols, corresponding to three Rx beams of the second UE 120-2 to be swept. In the example of FIG. 7, r=3, and each set of r symbols includes an AGC symbol followed by two symbols for transmitting PSSCH data and BT-RSs. Each of the symbols for transmitting the PSSCH data and the BT-RSs may include multiple resource elements.

In some aspects, the first UE 120-1 may transmit PSSCH data on one or more of the resource elements of a PSSCH/BT-RS symbol, and the first UE 120-1 may transmit BT-RSs on one or more of the resource elements of the PSSCH/BT-RS symbol. In some aspects, each of the PSSCH/BT-RS symbols may be configured with a respective subset of resource elements for transmitting PSSCH data and a respective subset of resource elements for transmitting BT-RSs. The BT-RSs transmitted by the first UE 120-1 may be any reference signals (e.g., channel state information (CSI) reference signals) that can be used to perform a beam measurement.

The first UE 120-1 may transmit PSCCH communications, the PSSCH data, and the BT-RSs using a current Tx beam associated with the current beam pair link between the first UE 120-1 and the second UE 120-2. In some aspects, the first UE 120-1 may repeat transmission of the same PSSCH data in each set of r symbols in the TTI. For example, the first UE 120-1 may transmit, in each set of r symbols in the TTI, the BT-RSs and a repetition of the same MAC-CE over the PSSCH. In this case, the first UE 120-1 may segment the MAC-CE element to fit in the r−1 symbols for transmitting the PSSCH data and the BT-RSs. In each set of r symbols, the first symbol (e.g., the AGC symbol) may be filled with a copy of the second symbol without the BT-RSs or with some parity bits generated for the PSSCH data payload.

In some aspects, the first UE 120-1 may transmit a PSSCH data payload over the entire PSSCH occasion (e.g., all of the sets of r symbols) in the TTI. For example, the first UE 120-1 may generate a code block including the PSSCH data payload using a first code rate and transmit the code block over the multiple sets of r symbols in the TTI. The first UE 120-1 may determine the first code rate based on an assumption that the AGC symbols, in the sets of r symbols, will be punctured at the second UE 120-2, such that the puncturing of the AGC symbols at the second UE 120-2 results in a second code rate that is a higher effective code rate than the first code rate. In some aspects, the first UE 120-1 may transmit the PSSCH data payload in multiple code blocks over the multiple sets of r symbols in the TTI. In this case, the first UE 120-1 may generate each code block at the lower code rate (e.g., the first code rate). The first UE 120-1 may concatenate the multiple code blocks based at least in part on the locations of the AGC symbols in the sets of r symbols to cause each code block to have the same number of bits punctured at the second UE 120-2.

As further shown in FIG. 7, and by reference number 720, the second UE 120-2 may perform beam training based on the BT-RSs received from the first UE 120-1 in the TTI, and the second UE may decode the PSSCH data received in the TTI from the first UE 120-1. The second UE 120-2 may perform beam sweeping over multiple Rx beams of the second UE 120-2 while receiving the PSSCH data and the BT-RSs transmitted by the first UE 120-1 in the TTI. In some aspects, the second UE 120-2 may perform the beam sweeping based at least in part on receiving, from the first UE 120-1, an indication that PSSCH beam training is to be performed, or based at least in part on transmitting to the first UE 120-1 a request that PSSCH beam training be performed. In some aspects, the second UE 120-2 may receive each set of r symbols in the TTI using a different Rx beam. The second UE 120-2 may perform beam measurements for each different Rx beam based on the BT-RSs received in the respective set of r symbols in the TTI. For example, for each different Rx beam, the second UE 120-2 may perform one or more measurements of signal strength (e.g., one or more RSS measurements) based on the BT-RSs received on the Rx beam.

As further shown in FIG. 7, and by reference number 725, the second UE 120-2 may adjust an Rx beam for receiving sidelink communications from the first UE 120-1. The second UE 120-2 may select an Rx beam of the different Rx beams for which beam sweeping is performed based on the beam measurements performed for the different Rx beams. For example, the second UE 120-2 may select an Rx beam having the highest RSS measurements of the different Rx beams for which beam sweeping is performed. The second UE 120-2 may switch from a current Rx beam to the selected Rx beam, and use the selected Rx beam to receive sidelink communications from the first UE 120-1. In some aspects, the second UE 120-2 may also adjust a Tx beam for transmitting sidelink communications to the first UE 120-1 to switch to a Tx beam corresponding to the selected Rx beam (e.g., a Tx beam in the same direction as the selected Rx beam).

As described above in connection with FIG. 7, the first UE 120-1 may transmit, to the second UE 120-2, or the second UE 120-2 may transmit, to the first UE 120-1, an indication relating to PSSCH beam training. The first UE 120-1 may transmit, to the second UE 120-2 on symbols included in a TTI, PSSCH data and BT-RSs. The second UE 120-2 may decode the PSSCH data transmitted from the first UE 120-1 in the TTI, and the second UE 120-2 may perform beam training based at least in part on the BT-RSs transmitted from the first UE 120-1 in the TTI. As a result, beam training may be performed to improve a degraded beam pair link between the first UE 120-1 and the second UE 120-2 outside of semi-statically configured beam training windows to reduce the amount of time with the degraded beam pair link. Thus, the reliability, quality, and speed of the sidelink communications may be increased, and interruptions to the sidelink communications may be decreased. Furthermore, the amount of time that the first UE 120-1 and the second UE 120-2 communicate using a degraded beam pair link may be reduced without shortening a period in which the semi-statically configured beam training window occurs, thus reducing the network overhead for beam training as compared with shortening the period for the beam training window. This results in increased speed and throughput and decreased latency for sidelink communications in the network.

As indicated above, FIG. 7 is provided as an example. Other examples may differ from what is described with respect to FIG. 7.

Figure 8:
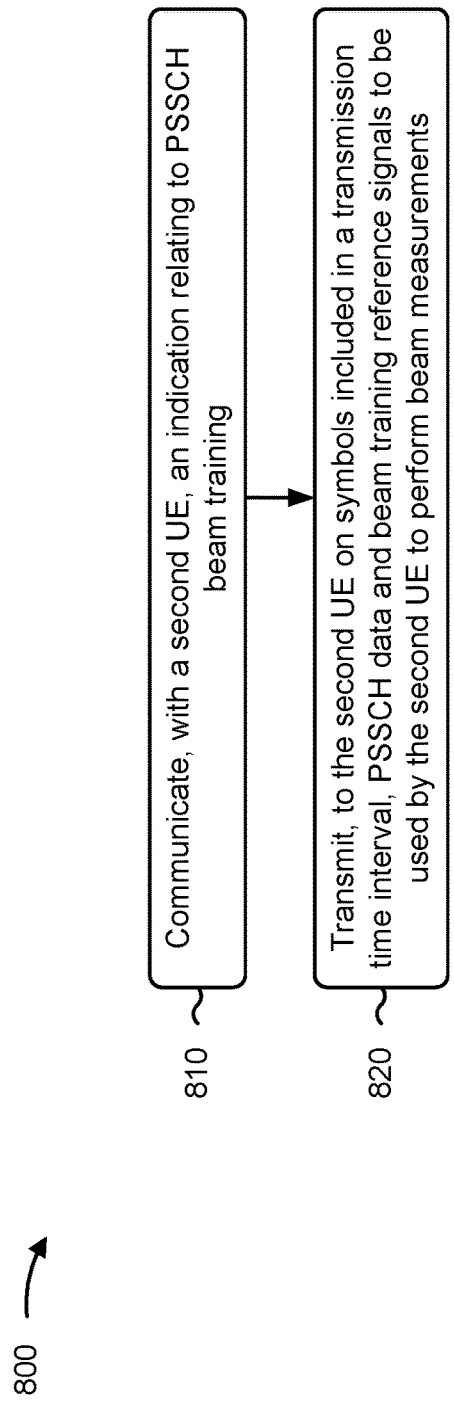
FIGS. 8-9 are diagrams illustrating example processes associated with reduced overhead sidelink beam training, in accordance with various aspects of the present disclosure.

FIG. 8 is a diagram illustrating an example process 800 performed, for example, by a first UE, in accordance with various aspects of the present disclosure. Example process 800 is an example where the first UE (e.g., UE 120) performs operations associated with reduced overhead sidelink beam training.

As shown in FIG. 8, in some aspects, process 800 may include communicating, with a second UE, an indication relating to PSSCH beam training (block 810). For example, the UE (e.g., using reception component 1002 and/or transmission component 1004, depicted in FIG. 10) may communicate, with a second UE, an indication relating to physical sidelink shared channel (PSSCH) beam training, as described above.

As further shown in FIG. 8, in some aspects, process 800 may include transmitting, to the second UE on symbols included in a transmission time interval, PSSCH data and beam training reference signals to be used by the second UE to perform beam measurements (block 820). For example, the UE (e.g., using transmission component 1004, depicted in FIG. 10) may transmit, to the second UE on symbols included in a transmission time interval, PSSCH data and beam training reference signals to be used by the second UE to perform beam measurements, as described above.

Process 800 may include additional aspects, such as any single aspect or any combination of aspects described below and/or in connection with one or more other processes described elsewhere herein.

In a first aspect, communicating the indication relating to PSSCH beam training comprises receiving, from the second UE, an RRC communication including the indication.

In a second aspect, communicating the indication relating to PSSCH beam training comprises transmitting, to the second UE, an RRC communication including the indication.

In a third aspect, or in combination with one or more of the first through second aspects, communicating the indication relating to PSSCH beam training comprises transmitting, in a control channel of the transmission time interval, SCI indicating that the transmission time interval is for PSSCH beam training.

In a fourth aspect, alone or in combination with the third aspect, the SCI includes an indication of a PSSCH beam training structure for the transmission time interval.

In a fifth aspect, alone or in combination with one or more of the first through fourth aspects, communicating the indication relating to PSSCH beam training comprises transmitting, in a control channel of another transmission time interval, sidelink control information indicating a reservation of the transmission time interval for PSSCH beam training.

In a sixth aspect, alone or in combination with one or more of the first through fifth aspects, the transmission time interval includes an automatic gain control symbol, one or more PSCCH symbols, and multiple sets of symbols, each set of symbols of the multiple set of symbols including a respective automatic gain control symbol and one or more respective symbols for transmitting the PSSCH data and the beam training reference signals, and a number of the multiple sets of symbols corresponds to a number of Rx beams of the second UE for which the beam measurements are to be performed.

In a seventh aspect, alone or in combination with one or more of the first through sixth aspects, transmitting the PSSCH data and the beam training reference signals comprises transmitting in each of the multiple sets of symbols in the transmission time interval, the beam training reference signals and a repetition of a MAC-CE.

In an eighth aspect, alone or in combination with one or more of the first through sixth aspects, transmitting the PSSCH data and the beam training reference signals comprises transmitting, over the multiple sets of symbols in the transmission time interval, a code block including the PSSCH data, wherein the code block is generated using a first code rate that is determined such that puncturing of the respective automatic gain control symbols of the multiple sets of symbols at the second UE results in a second code rate at the second UE that is higher than the first code rate.

In a ninth aspect, alone or in combination with the eighth aspect, transmitting the code block including PSSCH data comprises transmitting, over the multiple sets of symbols in the transmission time interval, multiple code blocks including the PSSCH data, wherein each of multiple code blocks is generated using the first code rate, and wherein the multiple code blocks are concatenated, based in part on locations of the automatic gain control signals in the multiple sets of symbols, to cause a number of bits punctured at the second UE to be the same for each of the multiple code blocks.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
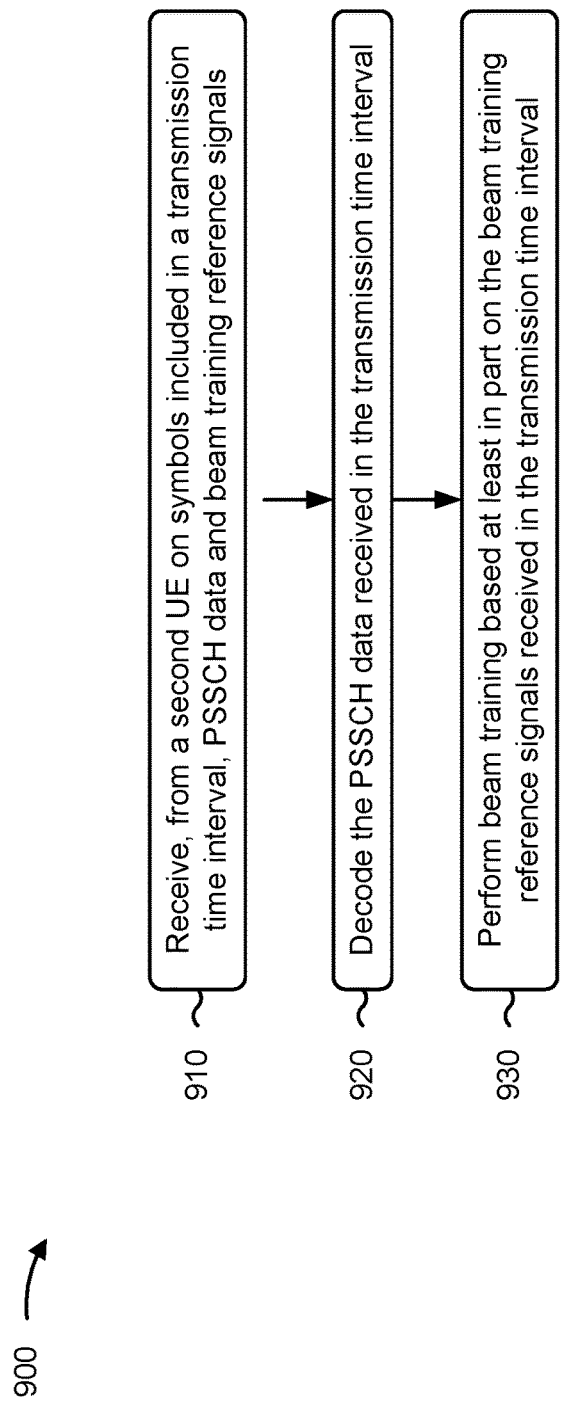

FIG. 9 is a diagram illustrating an example process 900 performed, for example, by a first UE, in accordance with various aspects of the present disclosure. Example process 900 is an example where the first UE (e.g., UE 120) performs operations associated with reduced overhead sidelink beam training.

As shown in FIG. 9, in some aspects, process 900 may include receiving, from a second UE on symbols included in a transmission time interval, PSSCH data and beam training reference signals (block 910). For example, the first UE (e.g., using reception component 1002, depicted in FIG. 10) may receive, from a second UE on symbols included in a transmission time interval, PSSCH data and beam training reference signals, as described above.

As further shown in FIG. 9, in some aspects, process 900 may include decoding the PSSCH data received in the transmission time interval (block 920). For example, the UE (e.g., using decoding component 1008, depicted in FIG. 10) may decode the PSSCH data received in the transmission time interval, as described above.

As further shown in FIG. 9, in some aspects, process 900 may include performing beam training based at least in part on the beam training reference signals received in the transmission time interval (block 930). For example, the UE (e.g., using beam training component 1010, depicted in FIG. 10) may perform beam training based at least in part on the beam training reference signals received in the transmission time interval, as described above.

Process 900 may include additional aspects, such as any single aspect or any combination of aspects described below and/or in connection with one or more other processes described elsewhere herein.

In a first aspect, performing beam training comprises performing beam measurements for multiple receive beams of the first UE based at least in part on the beam training reference signals, and selecting a receive beam from the multiple receive beams of the first UE based at least in part on the beam measurements.

In a second aspect, alone or in combination with the first aspect, process 900 includes transmitting, to the second UE, an RRC communication including an indication requesting PSSCH beam training.

In a third aspect, alone or in combination with one or more of the first and second aspects, process 900 includes receiving, from the second UE, an RRC communication including an indication relating to PSSCH beam training.

In a fourth aspect, alone or in combination with one or more of the first through third aspects, process 900 includes receiving, in a control channel of the transmission time interval, SCI indicating that the transmission time interval is for PSSCH beam training.

In a fifth aspect, alone or in combination with one or more of the first through fourth aspects, the SCI includes an indication of a PSSCH beam training structure for the transmission time interval.

In a sixth aspect, alone or in combination with one or more of the first through fifth aspects, process 900 includes receiving, in a control channel of another transmission time interval, sidelink control information indicating a reservation of the transmission time interval for PSSCH beam training.

In a seventh aspect, alone or in combination with one or more of the first through sixth aspects, the transmission time interval includes an automatic gain control symbol, one or more PSCCH symbols, and multiple sets of symbols, each set of symbols of the multiple set of symbols including a respective automatic gain control symbol and one or more symbols for transmitting the PSSCH data and the beam training reference signals, and performing beam training comprises performing, for each of multiple receive beams of the first UE, beam measurements based at least in part on the beam training reference signals received in the one or more symbols of a respective one of the multiple sets of symbols in the transmission time interval.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
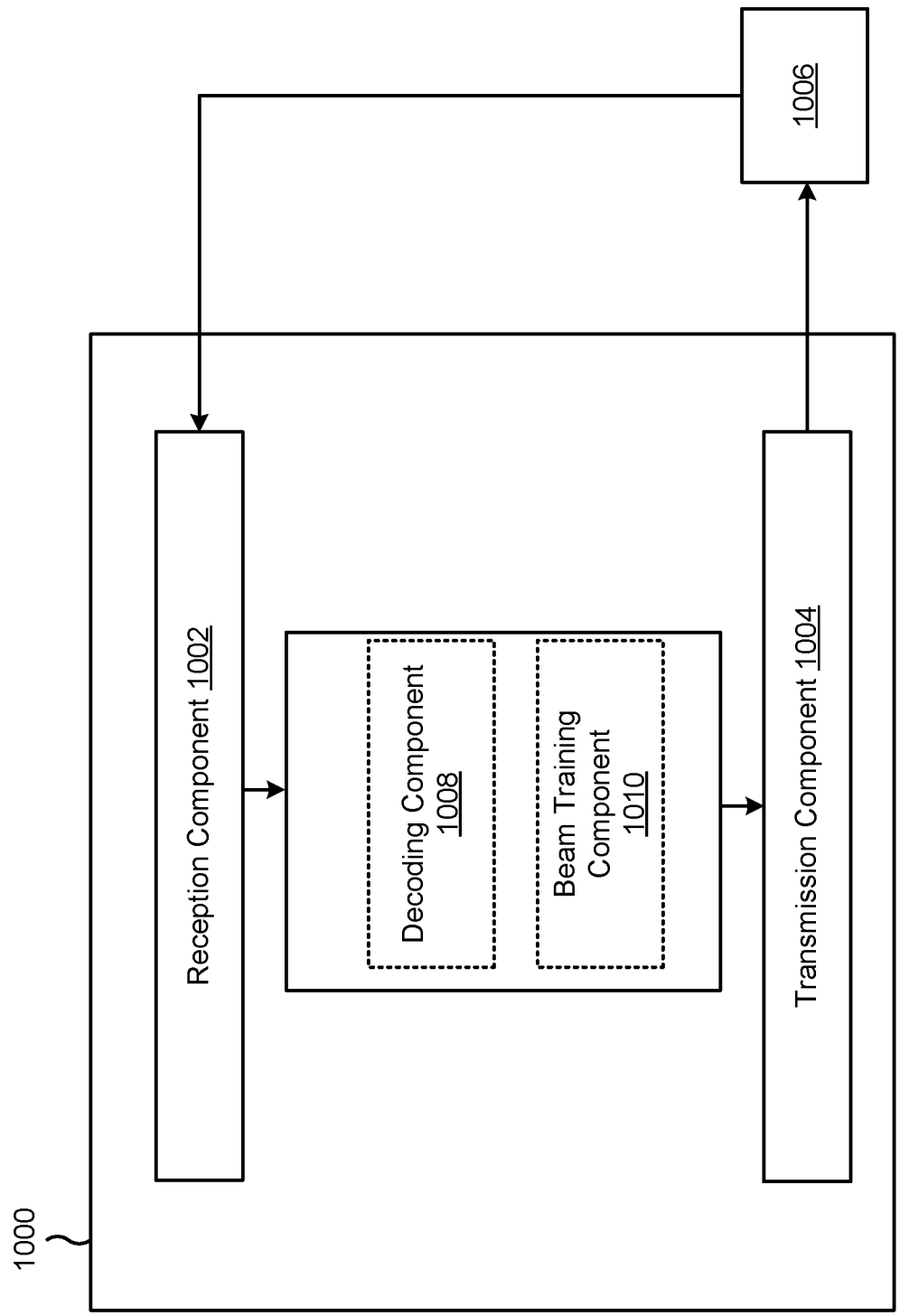
FIG. 10 is a block diagram of an example apparatus for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a decoding component 1008 or a beam training component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 and/or the transmission component 1004 may communicate, with a second UE, an indication relating to PSSCH beam training. The transmission component 1004 may transmit, to the second UE on symbols included in a transmission time interval, PSSCH data and beam training reference signals to be used by the second UE to perform beam measurements.

The reception component 1002 may receive, from a second UE on symbols included in a transmission time interval, PSSCH data and beam training reference signals. The decoding component 1008 may decode the PSSCH data received in the transmission time interval. The beam training component 1010 may perform beam training based at least in part on the beam training reference signals received in the transmission time interval.

The transmission component 1004 may transmit, to the second UE, an RRC communication including an indication requesting PSSCH beam training.

The reception component 1002 may receive, from the second UE, an RRC communication including an indication relating to PSSCH beam training.

The reception component 1002 may receive, in a control channel of the transmission time interval, SCI indicating that the transmission time interval is for PSSCH beam training.

The reception component 1002 may receive, in a control channel of another transmission time interval, sidelink control information indicating a reservation of the transmission time interval for PSSCH beam training.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a first user equipment (UE), comprising: communicating, with a second UE, an indication relating to physical sidelink shared channel (PSSCH) beam training; and transmitting, to the second UE on symbols included in a transmission time interval, PSSCH data and beam training reference signals to be used by the second UE to perform beam measurements.

Aspect 2: The method of aspect 1, wherein communicating the indication relating to PSSCH beam training comprises: receiving, from the second UE, a radio resource control (RRC) communication including the indication.

Aspect 3: The method of aspect 1, wherein communicating the indication relating to PSSCH beam training comprises: transmitting, to the second UE, a radio resource control (RRC) communication including the indication.

Aspect 4: The method of any of aspects 1-3, wherein communicating the indication relating to PSSCH beam training comprises: transmitting, in a control channel of the transmission time interval, sidelink control information (SCI) indicating that the transmission time interval is for PSSCH beam training.

Aspect 5: The method of aspect 4, wherein the SCI includes an indication of a PSSCH beam training structure for the transmission time interval.

Aspect 6: The method any of aspects 1-5, wherein communicating the indication relating to PSSCH beam training comprises: transmitting, in a control channel of another transmission time interval, sidelink control information indicating a reservation of the transmission time interval for PSSCH beam training.

Aspect 7: The method of any of aspects 1-6, wherein the transmission time interval includes an automatic gain control symbol, one or more physical sidelink control channel (PSCCH) symbols, and multiple sets of symbols, each set of symbols of the multiple set of symbols including a respective automatic gain control symbol and one or more respective symbols for transmitting the PSSCH data and the beam training reference signals, and wherein a number of the multiple sets of symbols corresponds to a number of Rx beams of the second UE for which the beam measurements are to be performed.

Aspect 8: The method of aspect 7, wherein transmitting the PSSCH data and the beam training reference signals comprises: transmitting in each of the multiple sets of symbols in the transmission time interval, the beam training reference signals and a repetition of a medium access control (MAC) control element.

Aspect 9: The method of aspect 7, wherein transmitting the PSSCH data and the beam training reference signals comprises: transmitting, over the multiple sets of symbols in the transmission time interval, a code block including the PSSCH data, wherein the code block is generated using a first code rate that is determined such that puncturing of the respective automatic gain control symbols of the multiple sets of symbols at the second UE results in a second code rate at the second UE that is higher than the first code rate.

Aspect 10: The method of aspect 9, wherein transmitting the code block including PSSCH data comprises: transmitting, over the multiple sets of symbols in the transmission time interval, multiple code blocks including the PSSCH data, wherein each of multiple code blocks is generated using the first code rate, and wherein the multiple code blocks are concatenated, based in part on locations of the automatic gain control signals in the multiple sets of symbols, to cause a number of bits punctured at the second UE to be the same for each of the multiple code blocks.

Aspect 11: A method of wireless communication performed by a first user equipment (UE), comprising: receiving, from a second UE on symbols included in a transmission time interval, physical sidelink shared channel (PSSCH) data and beam training reference signals; decoding the PSSCH data received in the transmission time interval; and performing beam training based at least in part on the beam training reference signals received in the transmission time interval.

Aspect 12: The method of aspect 11, wherein performing beam training comprises: performing beam measurements for multiple receive beams of the first UE based at least in part on the beam training reference signals; and selecting a receive beam from the multiple receive beams of the first UE based at least in part on the beam measurements.

Aspect 13: The method of any of aspects 11-12, further comprising: transmitting, to the second UE, a radio resource control (RRC) communication including an indication requesting PSSCH beam training.

Aspect 14: The method of any of aspects 11-13, further comprising: receiving, from the second UE, a radio resource control (RRC) communication including an indication relating to PSSCH beam training.

Aspect 15: The method of any of aspects 11-14, further comprising: receiving, in a control channel of the transmission time interval, sidelink control information (SCI) indicating that the transmission time interval is for PSSCH beam training.

Aspect 16: The method of aspect 15, wherein the SCI includes an indication of a PSSCH beam training structure for the transmission time interval.

Aspect 17: The method of any of aspects 11-16, further comprising: receiving, in a control channel of another transmission time interval, sidelink control information indicating a reservation of the transmission time interval for PSSCH beam training.

Aspect 18: The method of any of aspects 11-17, wherein the transmission time interval includes an automatic gain control symbol, one or more physical sidelink control channel (PSCCH) symbols, and multiple sets of symbols, each set of symbols of the multiple set of symbols including a respective automatic gain control symbol and one or more symbols for transmitting the PSSCH data and the beam training reference signals, and wherein performing beam training comprises: performing, for each of multiple receive beams of the first UE, beam measurements based at least in part on the beam training reference signals received in the one or more symbols of a respective one of the multiple sets of symbols in the transmission time interval.

Aspect 19: An apparatus for wireless communication at a device, comprising a processor; memory coupled with the processor; and instructions stored in the memory and executable by the processor to cause the apparatus to perform the method of one or more aspects of aspects 1-10.

Aspect 20: An apparatus for wireless communication at a device, comprising a processor; memory coupled with the processor; and instructions stored in the memory and executable by the processor to cause the apparatus to perform the method of one or more aspects of aspects 11-18.

Aspect 21: A device for wireless communication, comprising a memory and one or more processors coupled to the memory, the memory and the one or more processors configured to perform the method of one or more aspects of aspects 1-10.

Aspect 22: A device for wireless communication, comprising a memory and one or more processors coupled to the memory, the memory and the one or more processors configured to perform the method of one or more aspects of aspects 11-18.

Aspect 23: An apparatus for wireless communication, comprising at least one means for performing the method of one or more aspects of aspects 1-10.

Aspect 24: An apparatus for wireless communication, comprising at least one means for performing the method of one or more aspects of aspects 11-18.

Aspect 25: A non-transitory computer-readable medium storing code for wireless communication, the code comprising instructions executable by a processor to perform the method of one or more aspects of aspects 1-10.

Aspect 26: A non-transitory computer-readable medium storing code for wireless communication, the code comprising instructions executable by a processor to perform the method of one or more aspects of aspects 11-18.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-10.

Aspect 28: A non-transitory computer-readable medium storing a set of instructions for wireless communication, the set of instructions comprising one or more instructions that, when executed by one or more processors of a device, cause the device to perform the method of one or more aspects of aspects 11-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:

communicating, with a second UE, an indication identifying a frame structure for physical sidelink shared channel (PSSCH) beam training;

transmitting sidelink control information (SCI) indicating a transmission time interval for beam training; and transmitting, based at least in part on the frame structure and to the second UE on symbols included in flail the transmission time interval, PSSCH data and beam training reference signals to be used by the second UE to perform beam measurements.

2. The method of claim 1, wherein communicating the indication relating to PSSCH beam training comprises:

receiving, from the second UE, a radio resource control (RRC) communication including the indication.

3. The method of claim 1, wherein communicating the indication relating to PSSCH beam training comprises:

transmitting, to the second UE, a radio resource control (RRC) communication including the indication.

4. The method of claim 1, wherein communicating the indication relating to PSSCH beam training comprises:

transmitting, in a control channel of the transmission time interval, the SCI indicating that the transmission time interval is for PSSCH beam training.

5. The method of claim 4, wherein the SCI includes an indication of a PSSCH beam training structure for the transmission time interval.

6. The method of claim 1, wherein communicating the indication relating to PSSCH beam training comprises:

transmitting, in a control channel of another transmission time interval, the SCI indicating a reservation of the transmission time interval for PSSCH beam training.

7. The method of claim 1, wherein the transmission time interval includes an automatic gain control symbol, one or more physical sidelink control channel (PSCCH) symbols, and multiple sets of symbols, each set of symbols of the multiple set of symbols including a respective automatic gain control symbol and one or more respective symbols for transmitting the PSSCH data and the beam training reference signals, and wherein a number of the multiple sets of symbols corresponds to a number of receiver (Rx) beams of the second UE for which the beam measurements are to be performed.

8. The method of claim 7, wherein transmitting the PSSCH data and the beam training reference signals comprises:

transmitting in each of the multiple sets of symbols in the transmission time interval, the beam training reference signals and a repetition of a medium access control (MAC) control element.

9. The method of claim 7, wherein transmitting the PSSCH data and the beam training reference signals comprises:

transmitting, over the multiple sets of symbols in the transmission time interval, a code block including the PSSCH data, wherein the code block is generated using a first code rate that is determined such that puncturing of the respective automatic gain control symbols of the multiple sets of symbols at the second UE results in a second code rate at the second UE that is higher than the first code rate.

10. The method of claim 9, wherein transmitting the code block including PSSCH data comprises:

transmitting, over the multiple sets of symbols in the transmission time interval, multiple code blocks including the PSSCH data, wherein each of multiple code blocks is generated using the first code rate, and wherein the multiple code blocks are concatenated, based in part on locations of the automatic gain control signals in the multiple sets of symbols, to cause a number of bits punctured at the second UE to be the same for each of the multiple code blocks.

11. A method of wireless communication performed by a first user equipment (UE), comprising:

receiving, from a second UE on symbols included in a control channel of a transmission time interval, physical sidelink shared channel (PSSCH) data and beam training reference signals;

receiving, from the second UE, sidelink control information (SCI) indicating that the transmission time interval is for beam training;

decoding the PSSCH data received in the transmission time interval; and performing beam training based at least in part on the beam training reference signals received in the transmission time interval.

12. The method of claim 11, wherein performing beam training comprises:

performing beam measurements for multiple receive beams of the first UE based at least in part on the beam training reference signals; and selecting a receive beam from the multiple receive beams of the first UE based at least in part on the beam measurements.

13. The method of claim 11, further comprising:

transmitting, to the second UE, a radio resource control (RRC) communication including an indication requesting PSSCH beam training.

14. The method of claim 11, further comprising:

receiving, from the second UE, a radio resource control (RRC) communication including an indication relating to PSSCH beam training.

15. The method of claim 11, further comprising:

receiving, in a control channel of the transmission time interval, the SCI indicating that the transmission time interval is for PSSCH beam training.

16. The method of claim 15, wherein the SCI includes an indication of a PSSCH beam training structure for the transmission time interval.

17. The method of claim 11, further comprising:

receiving, in a control channel of another transmission time interval, the sidelink control information indicating a reservation of the transmission time interval for PSSCH beam training.

18. The method of claim 11, wherein the transmission time interval includes an automatic gain control symbol, one or more physical sidelink control channel (PSCCH) symbols, and multiple sets of symbols, each set of symbols of the multiple set of symbols including a respective automatic gain control symbol and one or more symbols for transmitting the PSSCH data and the beam training reference signals, and wherein performing beam training comprises:

performing, for each of multiple receive beams of the first UE, beam measurements based at least in part on the beam training reference signals received in the one or more symbols of a respective one of the multiple sets of symbols in the transmission time interval.

19. A first user equipment (UE) for wireless communication, comprising:

a memory; and one or more processors coupled to the memory, the one or more processors configured to:

communicate, with a second UE, an indication identifying a frame structure for physical sidelink shared channel (PSSCH) beam training;

transmit sidelink control information (SCI) indicating a transmission time interval for beam training; and transmit, based at least in part on the frame structure and to the second UE on symbols included in the transmission time interval, PSSCH data and beam training reference signals to be used by the second UE to perform beam measurements.

20. The first UE of claim 19, wherein the one or more processors, when communicating the indication relating to PSSCH beam training, are configured to:

receive, from the second UE, a radio resource control (RRC) communication including the indication.

21. The first UE of claim 19, wherein the one or more processors, when communicating the indication relating to PSSCH beam training, are configured to:

transmit, to the second UE, a radio resource control (RRC) communication including the indication.

22. The first UE of claim 19, wherein the one or more processors, when communicating the indication relating to PSSCH beam training, are configured to:

transmit, in a control channel of the transmission time interval, the SCI indicating that the transmission time interval is for PSSCH beam training.

23. The first UE of claim 22, wherein the SCI includes an indication of a PSSCH beam training structure for the transmission time interval.

24. The first UE of claim 19, wherein the transmission time interval includes an automatic gain control symbol, one or more physical sidelink control channel (PSCCH) symbols, and multiple sets of symbols, each set of symbols of the multiple set of symbols including a respective automatic gain control symbol and one or more respective symbols for transmitting the PSSCH data and the beam training reference signals, and wherein a number of the multiple sets of symbols corresponds to a number of receiver (Rx) beams of the second UE for which the beam measurements are to be performed.

25. The first UE of claim 24, wherein the one or more processors, when transmitting the PSSCH data and the beam training reference signals, are configured to:

transmit, in each of the multiple sets of symbols in the transmission time interval, the beam training reference signals and a repetition of a medium access control (MAC) control element.

26. The first UE of claim 24, wherein the one or more processors, when transmitting the PSSCH data and the beam training reference signals, are configured to:

transmit, over the multiple sets of symbols in the transmission time interval, a code block including the PSSCH data, wherein the code block is generated using a first code rate that is determined such that puncturing of the respective automatic gain control symbols of the multiple sets of symbols at the second UE results in a second code rate at the second UE that is higher than the first code rate.

27. The first UE of claim 26, wherein the one or more processors, when transmitting the code block including PSSCH data, are configured to:

transmit, over the multiple sets of symbols in the transmission time interval, multiple code blocks including the PSSCH data, wherein each of multiple code blocks is generated using the first code rate, and wherein the multiple code blocks are concatenated, based in part on locations of the automatic gain control signals in the multiple sets of symbols, to cause a number of bits punctured at the second UE to be the same for each of the multiple code blocks.

28. A first user equipment (UE) for wireless communication, comprising:

a memory; and one or more processors coupled to the memory, the one or more processors configured to:

receive, from a second UE on symbols included in a transmission time interval, physical sidelink shared channel (PSSCH) data and beam training reference signals;

receive, from the second UE, sidelink control information (SCI) indicating that the transmission time interval is for beam training;

decode the PSSCH data received in the transmission time interval; and perform beam training based at least in part on the beam training reference signals received in the transmission time interval.

29. The first UE of claim 28, wherein the one or more processors, when performing beam training, are configured to:

perform beam measurements for multiple receive beams of the first UE based at least in part on the beam training reference signals; and select a receive beam from the multiple receive beams of the first UE based at least in part on the beam measurements.

30. The first UE of claim 28, wherein the transmission time interval includes an automatic gain control symbol, one or more physical sidelink control channel (PSCCH) symbols, and multiple sets of symbols, each set of symbols of the multiple set of symbols including a respective automatic gain control symbol and one or more symbols for transmitting the PSSCH data and the beam training reference signals, and wherein the one or more processors, when performing beam training, are configured to:

perform, for each of multiple receive beams of the first UE, beam measurements based at least in part on the beam training reference signals received in the one or more symbols of a respective one of the multiple sets of symbols in the transmission time interval.

* * * * *